(12) United States Patent
Takahashi (10) Patent No.: US 9,499,041 B2
(45) Date of Patent: Nov. 22, 2016

(54) HYBRID VEHICLE AND CONTROL METHOD THEREOF

(71) Applicant: Toyota Jidosha Kabushiki Kaisha, Toyota-shi Aichi-ken (JP)

(72) Inventor: Yoshimitsu Takahashi, Miyoshi (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 14/613,880

(22) Filed: Feb. 4, 2015

(65) Prior Publication Data

US 2015/0239461 A1 Aug. 27, 2015

(30) Foreign Application Priority Data

Feb. 21, 2014 (JP) ................................. 2014-032330

(51) Int. Cl.
| | |
|---|---|
| *B60K 6/445* | (2007.10) |
| *B60W 10/06* | (2006.01) |
| *B60W 10/08* | (2006.01) |
| *B60K 6/365* | (2007.10) |
| *B60W 30/18* | (2012.01) |

(52) U.S. Cl.
CPC ............... *B60K 6/445* (2013.01); *B60K 6/365* (2013.01); *B60W 10/06* (2013.01); *B60W 10/08* (2013.01); *B60W 20/13* (2016.01); *B60W 30/18* (2013.01); *B60W 30/18036* (2013.01); *B60W 2540/10* (2013.01); *B60W 2550/142* (2013.01); *B60W 2710/0644* (2013.01); *B60W 2710/244* (2013.01); *Y02T 10/6239* (2013.01); *Y02T 10/6286* (2013.01); *Y10S 903/93* (2013.01)

(58) Field of Classification Search
CPC ................... B60W 20/106; B60W 30/18036; B60W 10/06; B60W 10/08; B60W 10/26; B60K 6/445; Y10S 903/93; B60L 11/00; B60L 3/00
See application file for complete search history.

(56) References Cited

U.S. PATENT DOCUMENTS

| | | | |
|---|---|---|---|
| 6,549,840 B1* | 4/2003 | Mikami .................. | B60K 6/365 180/243 |
| 2006/0247086 A1* | 11/2006 | Watanabe .............. | B60K 6/365 475/208 |
| 2011/0292332 A1 | 12/2011 | Yang et al. | |
| 2012/0309587 A1* | 12/2012 | Nozaki ..................... | B60K 6/48 477/5 |
| 2015/0094894 A1* | 4/2015 | Ito ............................. | B60L 1/02 701/22 |

FOREIGN PATENT DOCUMENTS

| | | |
|---|---|---|
| JP | 2004-056922 A | 2/2004 |
| JP | 2007-118918 A | 5/2007 |

(Continued)

*Primary Examiner* — Fadey Jabr
*Assistant Examiner* — Martin Weeks
(74) *Attorney, Agent, or Firm* — Dinsmore & Shohl LLP (57) ABSTRACT

A hybrid vehicle provided with an engine, a first motor generator, a planetary gear mechanism, a second motor generator, a battery, a battery state sensing unit which senses the voltage and the residual capacity of the battery, a steepness sensor which senses the uphill steepness, an accelerator pedal depression amount sensor, and a controller. The minimum rotation speed of the engine is set in accordance with the uphill steepness and the accelerator pedal depression amount, when the hybrid vehicle is travelling in reverse and the battery is charged with the voltage of the battery equal to or below a first threshold or the residual capacity of the battery equal to or below a second threshold.

8 Claims, 5 Drawing Sheets

(56) References Cited

FOREIGN PATENT DOCUMENTS

| | | |
|---|---|---|
| JP | 2007-137266 A | 6/2007 |
| JP | 2009-001097 A | 1/2009 |
| JP | 2010-155532 A | 7/2010 |
| JP | 2010-163090 A | 7/2010 |
| JP | 2010-195255 A | 9/2010 |
| JP | 2011-218827 A | 11/2011 |
| JP | 2011-245886 A | 12/2011 |
| JP | 2011-248297 A | 12/2011 |

* cited by examiner

HYBRID VEHICLE AND CONTROL METHOD THEREOF

PRIORITY INFORMATION

This application claims priority to Japanese Patent Application No. 2014-032330, filed on Feb. 21, 2014, which is incorporated herein by reference in its entirety.

BACKGROUND

Technical Field

The present invention relates to a configuration of a hybrid vehicle and a control method thereof.

Related Art

Recently, hybrid vehicles combining an engine and a motor generator are widely used. Such a hybrid vehicle often uses a vehicle drive system including a planetary gear mechanism which distributes motive power transmitted from an engine to a first motor generator and a vehicle drive shaft; and a second motor generator which transmits motive power to the vehicle drive shaft. Because the planetary gear mechanism cannot rotate the vehicle drive shaft in the reverse direction which is opposite to the rotation direction of the engine, a hybrid vehicle having such a vehicle drive system performs reverse travel by rotating the second motor generator connected to the vehicle drive shaft in the reverse direction.

Because the second motor generator is driven by using electric power from a battery, when the residual capacity of the battery is not enough, the reverse travel is performed by rotating the second motor generator in the reverse direction while driving the first motor generator by the engine to charge the battery with the generated electric power. A method is suggested to generate sufficient electric power to charge the battery when travelling in reverse by setting a higher rotation speed of the engine for a lower residual capacity of the battery. (For example, JP 2004-56922 A.)

Further, a method to control an engine and a motor generator is suggested in which, when travelling in reverse while charging a battery by using power from the engine, a higher electric power is assigned to be charged for a gentle uphill run, while a lower electric power is assigned to be charged for a steep uphill run. In this method, the power requested in accordance with the electric power assigned to be charged is transmitted from the engine such that the requested torque is transmitted to the drive shaft. (For example, JP 2010-195255 A.)

A method to increase drive torque of the second motor generator in the reverse direction by driving the engine using the first motor generator is also suggested (For example, JP 2011-218827 A).

However, in the conventional method disclosed in JP 2004-56922 A, when the battery voltage or the residual capacity of the battery is decreased due to, for example, a low temperature, drivability is deteriorated because the engine rotation speed becomes higher regardless of the driver's intention. Further, because the engine is maintained at a higher rotation speed for a lower battery voltage or residual capacity of the battery, a problem occurs that the system efficiency of the hybrid vehicle is deteriorated, resulting in a shorter drivable distance.

In a conventional control method disclosed in JP 2010-195255 A, when the steepness of an uphill run is large, demanding a high output, the electric power which can be charged to the battery is reduced. Therefore, in reverse travel on a steep uphill run, there is a problem that, because the driving force of the second motor generator decreases due to a decrease in the residual capacity of the battery, the drivability is deteriorated due to insufficient acceleration. A conventional method disclosed in JP 2011-218827 A has a problem that because the drive torque of the second motor generator is increased while driving the engine using the first generator, an energy loss becomes larger and the system efficiency of the hybrid vehicle is deteriorated.

SUMMARY

The present invention has an object to improve the system efficiency of a hybrid vehicle without lowering the drivability in reverse travel.

A hybrid vehicle according to the present invention comprises an engine, a first motor generator, a motive power distribution mechanism which distributes motive power transmitted from the engine to the first motor generator and a vehicle drive shaft, a second motor generator which transmits motive power to the vehicle drive shaft, a chargeable and dischargeable battery which transmits electric power to and from the first motor generator and the second motor generator, a battery state sensing unit which senses the voltage and the residual capacity of the battery, a steepness sensor which senses the uphill steepness in the travel direction, an accelerator pedal depression amount sensing unit which senses the accelerator pedal depression amount, and a controller which controls the rotation speed of the engine, wherein the controller comprises a first engine rotation speed setting unit which sets a minimum rotation speed of the engine in accordance with the uphill steepness in the travel direction sensed by the steepness sensor, and the accelerator pedal depression amount sensed by the accelerator pedal depression amount sensing unit, when the hybrid vehicle is in reverse travel as a result of driving the vehicle drive shaft with the second motor generator, and the battery is charged by driving the first motor generator using the engine with the voltage of the battery equal to or below a first threshold or the residual capacity of the battery equal to or below a second threshold.

It is preferable that in a hybrid vehicle according to the present invention, the first engine rotation speed setting unit sets a higher minimum rotation speed of the engine for a larger uphill steepness in the travel direction and a larger accelerator pedal depression amount.

It is preferable that in a hybrid vehicle according to the present invention, the controller further comprises an electric power output capability calculating unit which calculates the electric power output capability of the battery in accordance with the voltage or the residual capacity of the battery sensed by the battery state sensing unit, and a second engine rotation speed setting unit which sets the minimum rotation speed of the engine in accordance with the uphill steepness in the travel direction sensed by the steepness sensor, the accelerator pedal depression amount sensed by the accelerator pedal depression amount sensing unit, and the electric power output capability calculated by the electric power output capability calculating unit, when the hybrid vehicle is in reverse travel by driving the vehicle drive shaft by the second motor generator, and wherein the first motor generator is driven by the engine to supply electric power to the battery with the voltage of the battery over a third threshold higher than the first threshold or the residual capacity of the battery over a fourth threshold higher than the second threshold.

It is preferable that in a hybrid vehicle according to the present invention, the second engine rotation speed setting unit sets a higher minimum rotation speed of the engine for a larger uphill steepness in the travel direction and a larger accelerator pedal depression amount, and the second engine rotation speed setting unit sets a lower minimum rotation speed of the engine for a larger electric power output capability of the battery.

A hybrid vehicle according to the present invention comprises an engine, a first motor generator, a motive power distribution mechanism which distributes motive power transmitted from the engine to the first motor generator and a vehicle drive shaft, a second motor generator which transmits motive power to the vehicle drive shaft, a chargeable and dischargeable battery which transmits electric power to and from the first motor generator and the second motor generator, a battery state sensing unit which senses the voltage and the residual capacity of the battery, a steepness sensor which senses the uphill steepness in the travel direction, an accelerator pedal depression amount sensing unit which senses an accelerator pedal depression amount, and a controller which includes a CPU and controls the rotation speed of the engine, wherein the CPU executes a first engine rotation speed setting program which sets a minimum rotation speed of the engine in accordance with the uphill steepness in the travel direction sensed by the steepness sensor and the accelerator pedal depression amount sensed by the accelerator pedal depression amount sensing unit, when the hybrid vehicle is in reverse travel as a result of driving the vehicle drive shaft using the second motor generator, and the battery is charged by driving the first motor generator using the engine with the voltage of the battery equal to or below a first threshold or the residual capacity of the battery equal to or below a second threshold.

In a method for controlling a hybrid vehicle according to the present invention, the hybrid vehicle comprises an engine, a first motor generator, a motive power distribution mechanism which distributes motive power transmitted from the engine to the first motor generator and a vehicle drive shaft, a second motor generator which transmits motive power to the vehicle drive shaft, a chargeable and dischargeable battery which transmits electric power to and from the first motor generator and the second motor generator, a battery state sensing unit which senses the voltage and the residual capacity of the battery, a steepness sensor which senses the uphill steepness in the travel direction, and an accelerator pedal depression amount sensing unit which senses an accelerator pedal depression amount, and a minimum rotation speed of the engine is set in accordance with the uphill steepness in the travel direction sensed by the steepness sensor and the accelerator pedal depression amount sensed by the accelerator pedal depression amount sensing unit, when the hybrid vehicle is in reverse travel by driving the vehicle drive shaft by the second motor generator, and the battery is charged by driving the first motor generator using the engine with the voltage of the battery equal to or below a first threshold or the residual capacity of the battery equal to or below a second threshold.

The present invention achieves an advantage that the system efficiency of a hybrid vehicle is improved without deteriorating the drivability in reverse travel.

DETAILED DESCRIPTION

Figure 1:
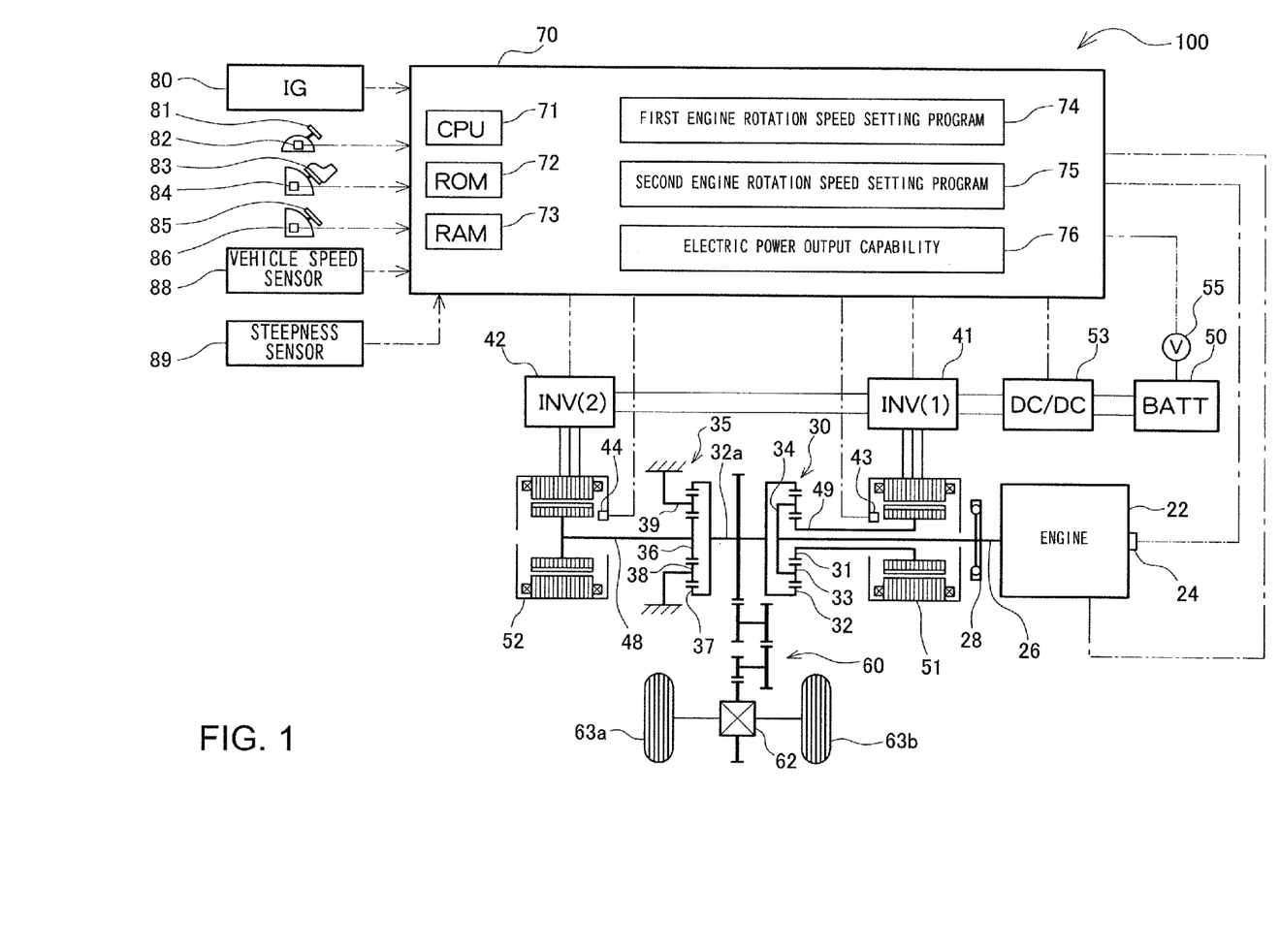
FIG. 1 is a system diagram showing a configuration of a hybrid vehicle system in an embodiment according to the present invention.

Embodiments according to the present invention are described below with reference to the attached drawings. As shown in FIG. 1, a hybrid vehicle according to an embodiment of the present invention is provided with an engine 22, a three-shaft type planetary gear mechanism 30 serving as a motive power distribution mechanism connected to a craft shaft 26 (output shaft of the engine 22) via a damper 28, a first motor generator (MG1) 51 connected to the planetary gear mechanism 30, a deceleration gear 35 mounted on a ring gear shaft 32a (vehicle drive shaft) connected to the planetary gear mechanism 30, a second motor generator (MG2) 52 connected to the deceleration gear 35, a battery 50 which is a chargeable and dischargeable secondary battery, and a controller 70.

The planetary gear mechanism 30 includes an external sun gear 31, an internal ring gear 32 positioned concentric to the sun gear 31, two or more pinion gears 33 which mesh with the sun gear 31 and the ring gear 32, and a carrier 34 which holds the pinion gears 33 such that the pinion gears 33 can rotate and orbit. The planetary gear mechanism 30 is configured to perform a differential operation using the sun gear 31, the ring gear 32, and the carrier 34 as rotatable elements. The craft shaft 26 of the engine 22 is attached to the carrier 34 of the planetary gear mechanism 30, the first motor generator 51 is attached to the sun gear 31, and the ring gear shaft 32a (vehicle drive shaft) is attached to the ring gear 32. When the first motor generator 51 serves as a power generator, the planetary gear mechanism 30 distributes motive power from the engine 22 transmitted through the carrier 34 to the sun gear 31 and the ring gear 32 in accordance with the gear ratio. When the first motor generator 51 serves as an electric motor, the planetary gear mechanism 30 combines the motive power from the engine 22 transmitted through the carrier 34 and the motive power from the first motor generator 51 transmitted through the sun gear 31 and transmits the combined power to the ring gear 32. The motive power transmitted to the ring gear 32 is further transmitted to drive wheels 63a, 63b of the vehicle from the ring gear shaft 32a via a gear mechanism 60 and a differential gear 62.

A rotation shaft 48 of the second motor generator 52 is connected to the ring gear shaft 32a (vehicle drive shaft) via the deceleration gear 35 such that the motive power of the second motor generator 52 is transmitted to the drive wheels 63a, 63b of the vehicle, via the deceleration gear 35, the ring gear shaft 32a, the gear mechanism 60, and the differential gear 62, together with the motive power from the engine 22 and the motive power from the first motor generator 51.

The deceleration gear 35 is configured as a gear mechanism which includes an external sun gear 36, an internal ring gear 37 positioned concentric to the sun gear 36, two or more pinion gears 38 which mesh with the sun gear 36 and the ring gear 37, and a carrier 39 which holds the pinion gears 38 such that the pinion gears 38 can rotate and orbit. The rotation shaft 48 of the second motor generator 52 is attached to the sun gear 36 of the deceleration gear 35, and the ring gear shaft 32a (vehicle drive shaft) is attached to the ring gear 37. Because the carrier 39 of the deceleration gear 35 is non-rotatably fixed to an enclosure, the deceleration gear 35 decelerates the rotation speed of the rotation shaft 48 of the second motor generator 52 for the gear ratio between the sun gear 36 and the ring gear 37.

Each of the first and the second motor generators 51, 52 is configured as a well known synchronous motor generator which can be driven as a power generator and also as an electric motor such that the first and the second motor generators 51, 52 transmit electric power to and from the battery 50 via a first inverter 41 and a second inverter 42. A boost converter 53 is connected between the battery 50 and the first and the second inverters 41, 42 so as to boost the voltage from the battery 50 and supply the boosted voltage to each of the first and the second inverters 41, 42. The battery is connected with a battery state sensing unit 55 which senses the voltage, the output electric current, the temperature, and the residual capacity of the battery 50. The battery state sensing unit 55 includes sensors, each of which senses the voltage, the electric current, and the temperature of the battery 50. The battery state sensing unit 55 is configured to output the sensed voltage, the electric current, and the temperature to the controller 70, calculate the residual capacity of the battery 50 based on the sensed voltage, the output electric current, and the temperature, and output the obtained data. It should be noted that the battery state sensing unit 55 may be configured to calculate the residual capacity of the battery 50 in such a manner that the controller 70 internally performs processing based on the respective signals from the sensors of the voltage, the output electric current, and the temperature of the battery 50.

The controller 70 is a computer provided with a CPU 71 which performs calculation and processing of signals, a ROM 72 which stores a processing program, and a RAM 73 which temporarily stores data. An electric power output capability calculation program 76 is also provided to calculate the electric power (output capability Wout) from the battery 50 based on the voltage or the residual capacity of the battery 50 in response to setting of the minimum rotation speed of the engine. The CPU 71 executes the first and second engine rotation speed setting programs 74, 75 and the electric power output capability calculation program 76. The controller 70 receives, via input ports, an ignition signal from an ignition switch 80, a shift position signal from a shift position sensor 82 which senses the operation position of a shift lever 81, a signal from an accelerator pedal depression amount sensor 84 (accelerator pedal depression amount sensing unit) which senses the depression amount of an accelerator pedal 83, a signal from a brake pedal depression amount sensor 86 which senses the depression amount of a brake pedal 85, a vehicle speed signal from a vehicle speed sensor 88, and an uphill steepness in the vehicle travel direction signal from a steepness sensor 89. Further, each of the engine 22, the inverters 41, 42, and the boost converter 53 is connected to the controller 70 such that these elements are driven in accordance with a command from the controller 70. Both of a resolver 24 which is attached to the engine 22 and resolvers 43, 44 which are respectively attached to the first and the second motor generators 51, 52 are connected to the controller 70 and configured such that each of the signals indicating the rotation speed of the engine 22, and the position of a rotator of the motor generators 51, 52, are input to the controller 70.

Figure 2:
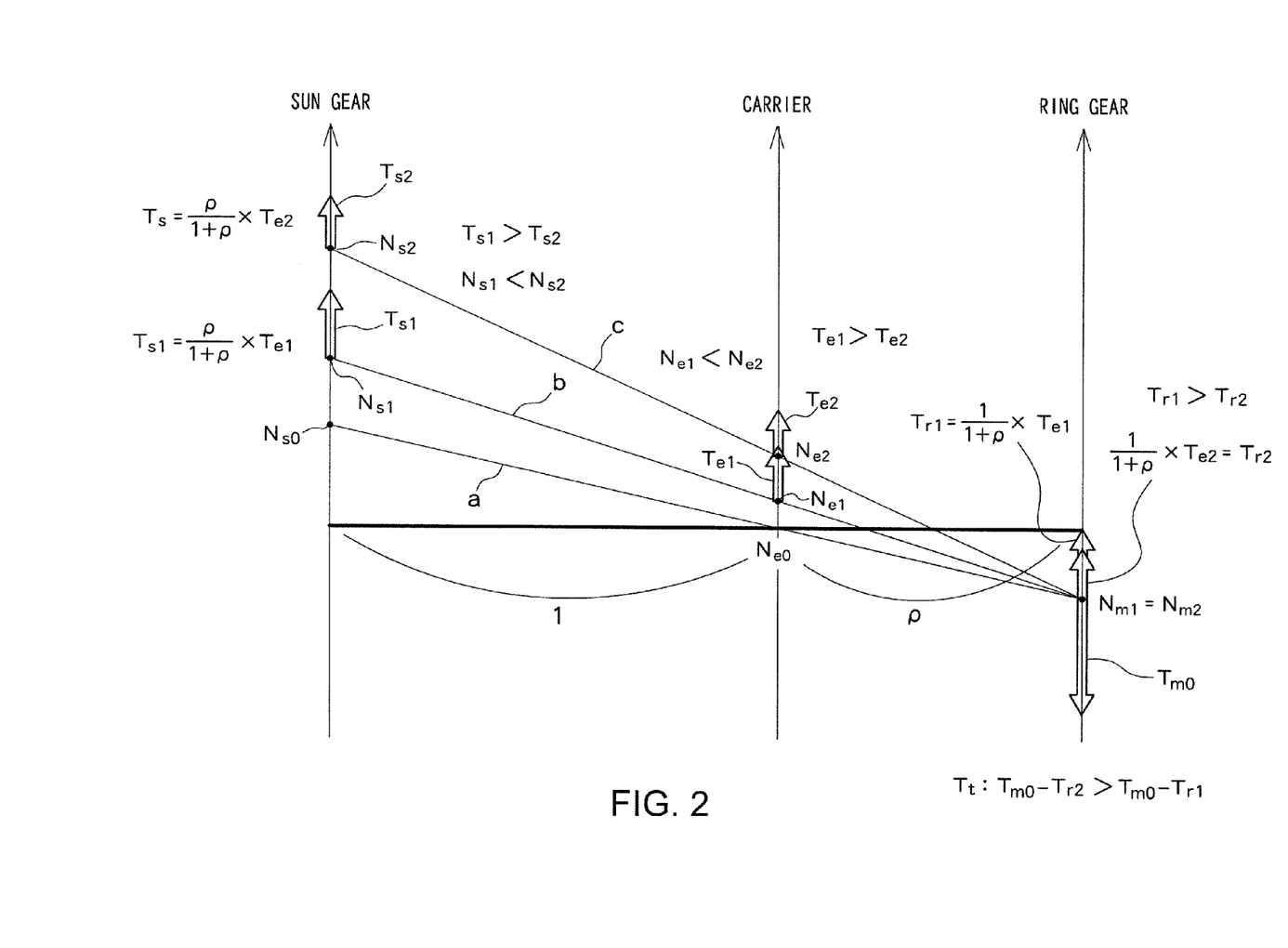
FIG. 2 is an alignment chart of a hybrid vehicle according to the present invention in reverse travel.

Basic operations for driving a hybrid vehicle 100 having the configuration described above in reverse travel are described below with reference to FIG. 2. As shown by the line a in FIG. 2, the controller 70 stops the engine 22 (by setting the rotation speed Ne of the engine 22 at zero) and rotates the second motor generator 52 in the reverse direction with the electric power supplied from the battery 50 by setting the rotation speed Nm at $Nm_0$ and the output torque at $Tm_0$. This output torque $Tm_0$ is transmitted to the ring gear shaft 32a (vehicle drive shaft) as vehicle drive torque Tt to rotate the drive wheels 63a, 63b in the reverse direction. Therefore, in this case, the vehicle drive torque Tt in the reverse direction can be expressed as $Tt=Tm_0$. At this time, the first motor generator 51 is idling at rotation speed $Ns_0$ as shown by the line a in FIG. 2.

Next, basic operations when the engine 22 is rotated during reverse travel while generating power using the first motor generator 51 and charging the battery 50 with the generated power are described below. The controller 70 rotates the second motor generator 52 in the reverse direction with rotation speed Nm set at $Nm_0$ and output torque at $Tm_0$. The controller 70 starts the engine 22 and sets the rotation speed Ne of the engine 22 at $Ne_1$ and the output torque Te at $Te_1$ as shown in the line b in FIG. 2. Because the rotation speed Nm of the second motor generator 52 is $Nm_0$ (reverse direction) and the engine rotation speed Ne is $Ne_1$ (forward direction), the rotation speed Ns of the first motor generator 51 becomes $Ns_1$ (forward direction) as shown by the line b in FIG. 2. The output torque $Te_1$ from the engine 22 is distributed by the planetary gear mechanism 30 (motive power distribution mechanism) to the torque $Ts_1$ which rotates the rotation shaft 49 of the first motor generator 51 in the forward direction and the direct-to-engine torque $Tr_1$ which rotates, via the ring gear 37, the rotation shaft 48 of the second motor generator 52 in the forward direction.

The distribution ratio of the engine output torque $Te_1$ between the torque Ts and the direct-to-engine torque $Tr_1$ is determined by the ratio ρ of the number of teeth of the sun gear 31 to the number of teeth of the ring gear 32 in the planetary gear mechanism 30. The ratio ρ of the number of teeth of the sun gear 31 to the number of teeth of the ring gear 32 can be obtained by the following equation:

$$\rho = (\text{number of teeth of sun gear 31})/(\text{number of teeth of ring gear 32}) \quad \text{(Equation 1)}$$

$$Ts_1 = \rho/(1+\rho) \times Te_1 \quad \text{(Equation 2)}$$

$$Tr_1 = 1/(1+\rho) \times Te_1 \quad \text{(Equation 3)}$$

The torque $Ts_1$ is used for rotating the rotation shaft 49 of the first motor generator 51 in the forward direction to drive the first motor generator 51 as a power generator. The direct-to-engine torque $Tr_1$ is applied to the rotation shaft 48 of the second motor generator 52 in the forward direction. Therefore, the vehicle drive torque Tt in the reverse direction transmitted from the second motor generator 52 to the ring gear shaft 32a (vehicle drive shaft) can be expressed as $Tt=(Tm_0-Tr_1)$. Thus, when rotating the engine 22 during reverse travel to generate power by the first motor generator 51, the torque transmitted from the second motor generator 52 to the vehicle drive shaft is reduced by the amount of the direct-to-engine torque compared to the output torque $Tm_0$ of the second motor generator 52.

In contrast, because the regenerated power (kW) obtained when generating power by driving the first motor generator 51 as a power generator is proportional to the power obtained by multiplying the rotation speed by the torque (N*m/s), in order to obtain an equal amount of the generated power or the power charged to the battery 50, the torque Ts can be reduced by setting a higher rotation speed Ns of the first motor generator 51. As shown in the above Equations (2) and (3), decreasing the torque $Ts_1$ distributed to the first motor generator 51 is equivalent to decreasing the output torque $Te_1$ of the engine. As a result, the direct-to-engine torque Tr in the forward direction distributed to the second motor generator 52 also decreases. In other words, as shown by the line c in FIG. 2, when the rotation speed Ns of the first motor generator 51 is set at $Ns_2$ which is higher than the $Ns_1$ on the line b, and the torque Ts is set at $Ts_2$ (on the line c) which is lower than the $Ts_1$ on the line b, the direct-to-engine torque Tr shown by the outlined arrow in FIG. 2 can be set at $Tr_2$ which is lower than the $Tr_1$. As described above, because the vehicle drive torque Tt becomes (Tm−Tr) when the first motor generator 51 is driven by the engine 22 during reverse travel, the vehicle drive torque Tt (Tm−Tr) is increased higher for a decreased amount of the direct-to-engine Tr when increasing the rotation speed Ne of the engine 22 while decreasing the direct-to-engine torque Tr. Therefore, during reverse travel while generating power, equal reverse travel can be achieved with a lower output torque Tm of the second motor generator 52 when the rotation speed Ne of the engine 22 is set higher.

However, because a loss of the engine 22 increases when the rotation speed is increased, the system efficiency of the hybrid vehicle 100 as a whole is deteriorated if the rotation speed of the engine 22 is set too high. Therefore, the present invention has an object to improve the system efficiency of the hybrid vehicle 100 as a whole by changing the minimum rotation speed of the engine 22 in accordance with the travel state, the residual capacity of the battery, or the like during reverse travel, while generating power by driving the first motor generator 51 using the engine 22 of the hybrid vehicle 100.

With reference to FIGS. 2 to 5, operations of the hybrid vehicle 100 according to an embodiment of the present invention are described below in which the hybrid vehicle 100 is in reverse travel while generating power by driving the first motor generator 51 using the engine 22.

Figure 3:
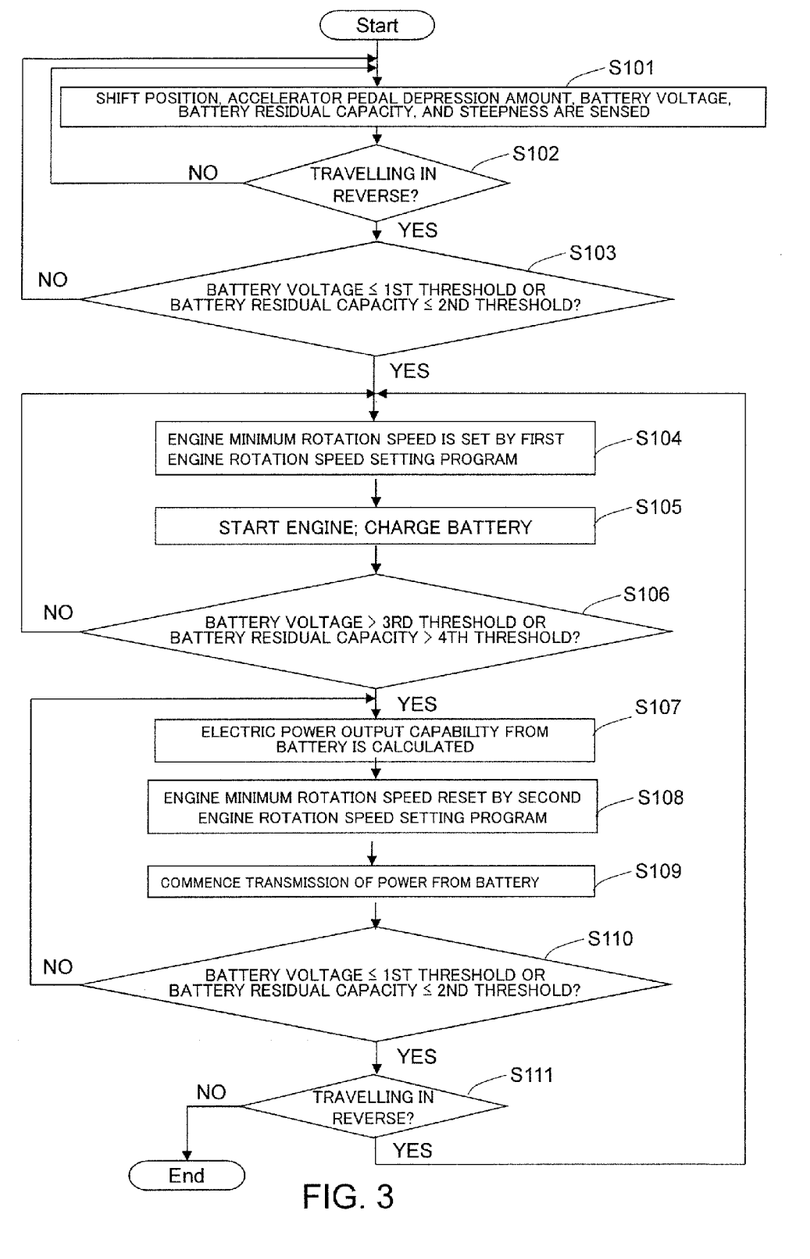
FIG. 3 is a flowchart showing operations of a hybrid vehicle according to the present invention.

As shown in step S101 in FIG. 3, the controller 70 receives a shift position signal from the shift position sensor 82 shown in FIG. 1, an accelerator pedal depression amount signal from the accelerator pedal depression amount sensor 84, and an uphill steepness signal in the travel direction from the steepness sensor. The controller 70 also receives signals indicating the voltage, the output electric current, the temperature, and the residual capacity of the battery 50 from the battery state sensing unit 55. As shown in step S102, the controller 70 determines whether or not the hybrid vehicle 100 is in reverse travel (in load operation in the reverse direction) based on, for example, whether the shift position is in the reverse position and the accelerator pedal depression amount is over a predetermined value. When the controller 70 determines that the hybrid vehicle 100 is in reverse travel, the controller 70 proceeds to step S103 in FIG. 3. Otherwise, the controller 70 returns to step S101 in FIG. 3 and continues monitoring of the shift position, the accelerator pedal depression amount, the uphill steepness in the travel direction, and the voltage and the residual capacity of the battery.

As shown in step S103 in FIG. 3, the controller 70 determines whether the voltage of the battery 50 sensed by the battery state sensing unit 55 is equal to or below a first threshold, or whether the residual capacity of the battery 50 is equal to or below a second threshold. When the voltage of the battery 50 is equal to or below the first threshold, or the residual capacity of the battery 50 is equal to or below the second threshold (for example, 30% or 40%), the controller 70 determines that the electric power output capability (Wout) from the battery 50 is zero and returns to step S104 in FIG. 3, in which the controller 70 executes the first engine rotation speed setting program 74 shown in FIG. 1 to set the minimum rotation speed of the engine 22. As shown in S105 in FIG. 3, the controller 70 starts the engine 22 to drive the first motor generator 51 as a power generator such that the generated power is used to drive the second motor generator 52 to perform the reverse travel, while charging the battery 50 with the remaining electric power. Because the electric power supplied from the first motor generator 51 to the battery 50 is higher than the electric power supplied to the second motor generator 52 from the battery 50, the battery 50 is charged.

Figure 4:
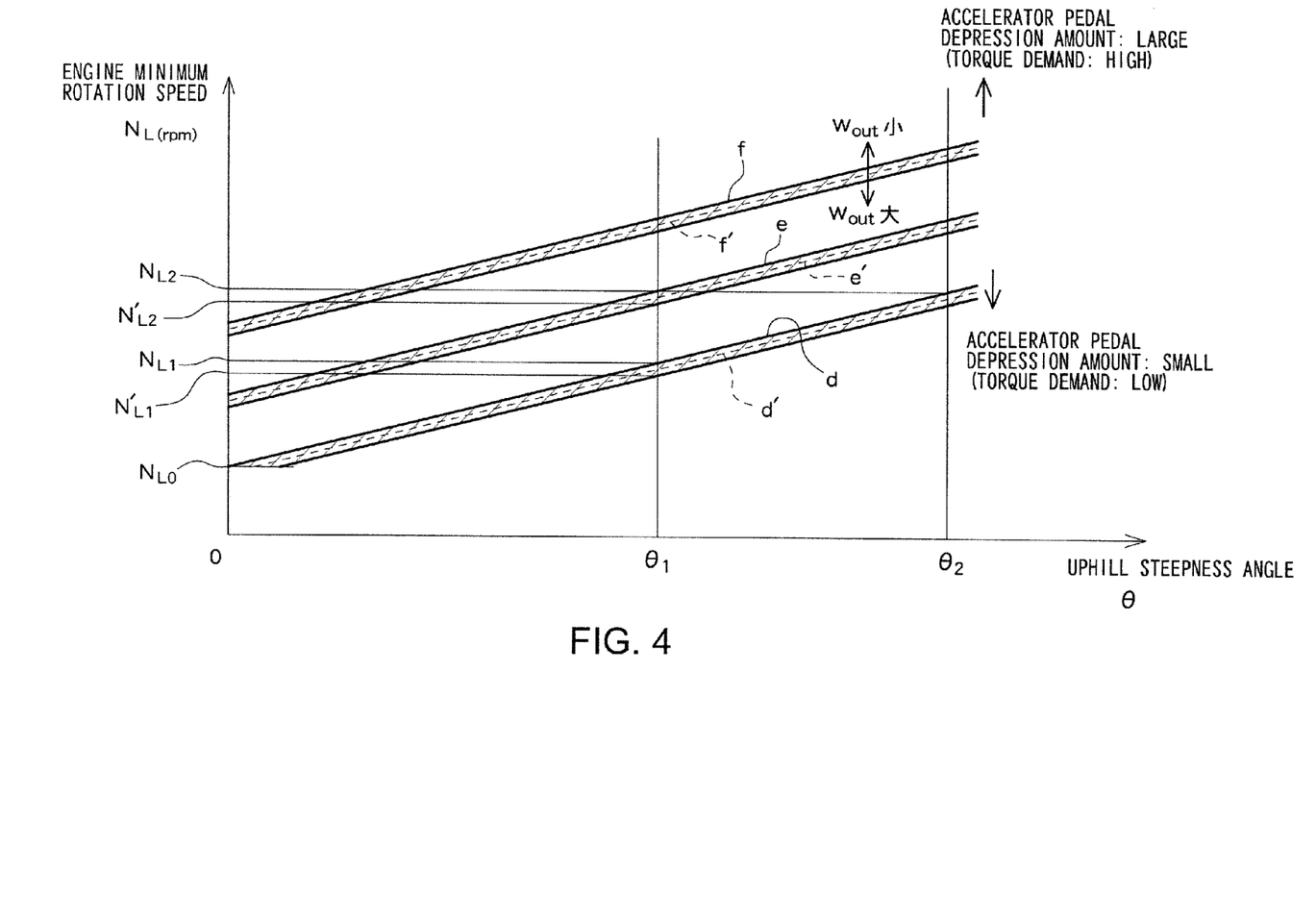
FIG. 4 is a graph mapping the minimum engine rotation speed with regard to the uphill steepness, the depression amount of an accelerator pedal, and the electric power output capability (Wout) from a battery, in a hybrid vehicle according to the present invention.

By referring to the mapping graph shown in FIG. 4 stored in the ROM 72, the controller 70 executes the first engine rotation speed setting program 74 shown in FIG. 1 in the manner described below. The map shown in FIG. 4 defines the engine minimum rotation speed NL in accordance with the steepness angle θ of the uphill on which the hybrid vehicle 100 is driving, the accelerator pedal depression amount, and the electric power output capability (Wout) from the battery. In FIG. 4, $NL_0$ is the minimum rotation speed of the engine 22, such as the idling rotation speed. As shown in FIG. 4, the engine minimum rotation speed NL of the engine 22 is set higher when the uphill steepness angle θ in the reverse direction is larger. The engine minimum rotation speed NL is also set higher when the accelerator pedal depression amount applied by the driver (in other words, the torque demanded by the driver) is larger. With the same accelerator pedal depression amount, the minimum rotation speed NL of the engine 22 is set lower within the hatched area shown in FIG. 4 for a higher electric power output capability (Wout) from the battery 50, while the engine minimum rotation speed NL of the engine 22 is set higher within the hatched area shown in FIG. 4 for a lower electric power output capability (Wout) from the battery 50. Because the electric power output capability (Wout) from the battery 50 becomes zero when the voltage of the battery 50 is equal to or below the first threshold, or the residual capacity of the battery 50 is equal to or below the second threshold, the engine minimum rotation speed NL of the engine 22 is set solid lines d or e, f at the top to the range defined by the hatched area.

For example, when the controller 70 determines in step S103 in FIG. 3 that the voltage of the battery 50 is equal to or below the first threshold, or the residual capacity of the battery 50 is equal to or below the second threshold, the steepness angle θ of an uphill run on which the hybrid vehicle 100 is travelling in reverse is at $θ_1$ shown in FIG. 4, and the accelerator pedal depression amount by the driver is low, the engine minimum rotation speed NL is set at $NL_1$ in accordance with the line d in the mapping graph shown in FIG. 4. When the steepness angle θ of an uphill run on which the hybrid vehicle 100 is travelling in reverse is at $θ_1$ shown in FIG. 4, and the accelerator pedal depression amount by the driver is at a medium degree, the engine minimum rotation speed NL is set at $NL_2$ in accordance with the line e in the mapping graph in FIG. 4. When the steepness angle θ of an uphill run on which the hybrid vehicle 100 is travelling in reverse is at $\theta_2$ which represents a steeper uphill run, and the accelerator pedal depression amount by the driver is low, the engine minimum rotation speed NL is also set at $NL_2$ in accordance with the line d in the mapping graph in FIG. 4.

Figure 5A:
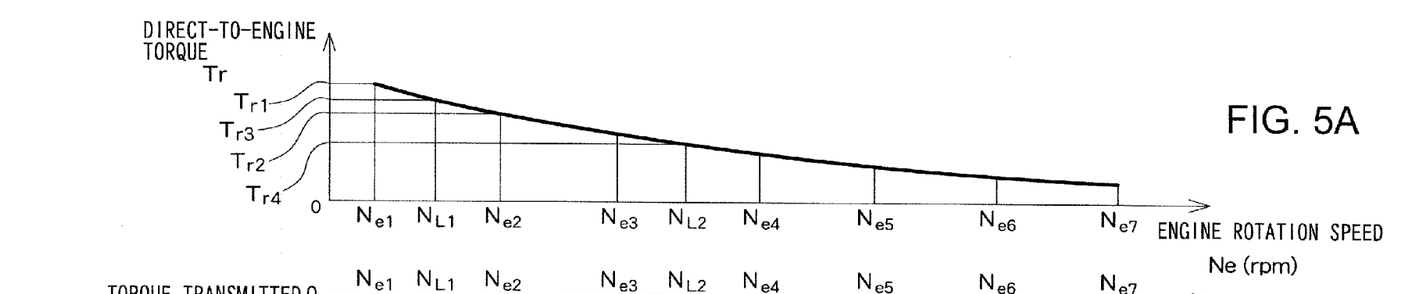
FIG. 5A is a graph showing a directly-to-engine torque Tr with respect to the engine rotation speed.
Figure 5B:
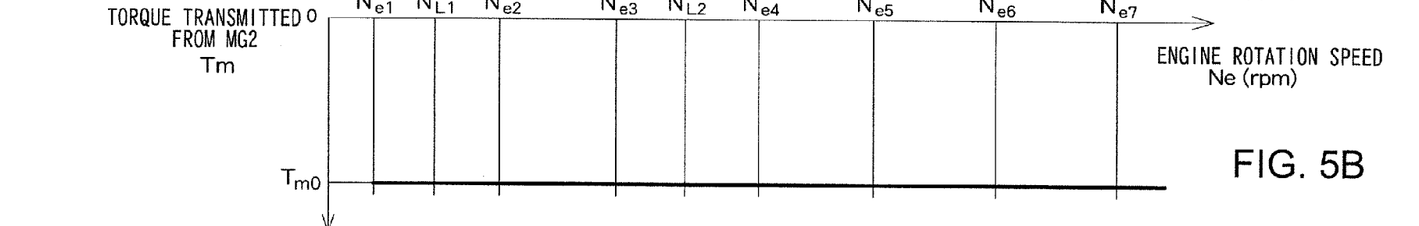
FIG. 5B is a graph showing a output torque Tm of the second motor generator with respect to the engine rotation speed.
Figure 5C:
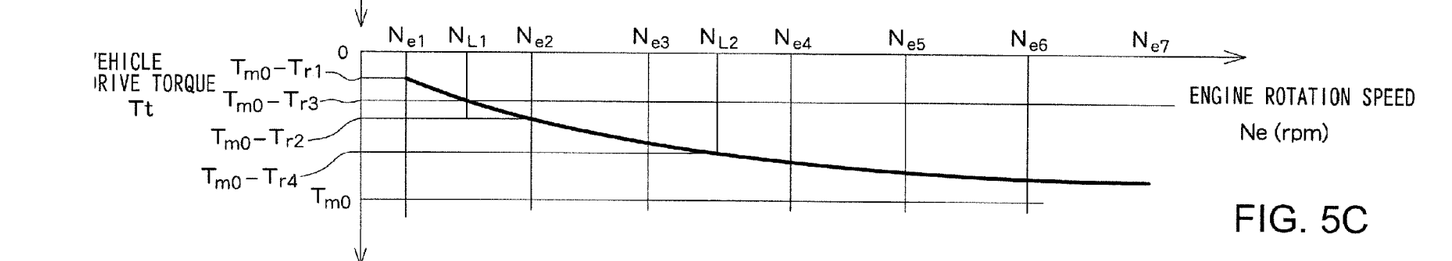
FIG. 5C is a graph showing a, and vehicle drive torque Tt with respect to the engine rotation speed.

When the engine minimum rotation speed NL is set at $NL_1$ in accordance with the line d in the mapping graph in FIG. 4 with the steepness angle θ of an uphill run on which the hybrid vehicle 100 is travelling in reverse set at $\theta_1$ shown in FIG. 4, and with the accelerator pedal depression amount being low, the direct-to-engine torque Tr is set at $Tr_3$ which is lower than the $Tr_1$ applied in a case when the engine minimum rotation speed NL is not set, as shown in FIG. 5A-5C. When the output torque $Tm_0$ of the second motor generator 52 is constant, the absolute value of the vehicle drive torque Tt (Tm−Tr) transmitted to the ring gear shaft 32a is increased $(Tm_0-Tr_3)$ compared to the absolute value of the vehicle drive torque Tt $(Tm_0-Tr_1)$ which is applied when the engine minimum rotation speed NL is not set. As a result, a larger driving force in the reverse direction can be transmitted to the ring gear shaft 32a (vehicle drive shaft).

When the steepness angle θ of an uphill run on which the hybrid vehicle 100 is travelling in reverse is $\theta_1$ in FIG. 4 as in the previous example, and the accelerator pedal depression amount by the driver is at a medium degree, the engine minimum rotation speed NL is set at $NL_2$ in accordance with the line e in the mapping graph shown in FIG. 4. In other words, with the same uphill steepness, a higher engine minimum rotation speed NL of the engine 22 is set for a higher driving force demanded by the driver by strongly depressing the accelerator pedal (attempting to accelerate the hybrid vehicle 100) than for a lower depression amount of the accelerator pedal, such that the engine 22 is driven at a rotation speed equal to or higher than $NL_2$. In such a case, as shown in FIG. 5A-5C, the direct-to-engine torque Tr becomes $Tr_4$ which is lower than $Tr_3$ applied when the engine minimum rotation speed NL is set at $NL_1$. The vehicle drive torque Tr (Tm−Tr) which is transmitted to the ring gear shaft 32a (vehicle drive shaft) becomes $(Tm_0-Tr_4)$ having a larger absolute value than $(Tm_0-Tr_3)$, resulting in a larger driving force in the reverse direction transmitted to the ring gear shaft 32a (vehicle drive shaft).

As described above, according to embodiments of the present invention, because a higher engine minimum rotation speed NL of the engine 22 is set for a larger drive torque demanded through depression of the accelerator pedal by the driver, resulting in a higher vehicle drive torque Tt transmitted to the ring gear shaft 32a (vehicle drive shaft), it becomes possible to balance among the driver's driving comfort, the rotation speed of the engine 22, and the magnitude of the driving force. As a result, the drivability in the reverse uphill travel can be improved. Further, in embodiments of the present invention, because the engine minimum rotation speed NL of the engine 22 is set higher when required based on the mapping graph shown in FIG. 4, the engine 22 is not always operated at a high speed, and thus the system efficiency of the hybrid vehicle 100 can be improved, resulting in a larger drivable distance.

As described above, when the first motor generator 51 is driven as a power generator by the engine 22 and the generated power is used to charge the battery 50, the voltage or the residual capacity of the battery 50 increases. As shown in step S106 in FIG. 3, when the voltage of the battery 50 sensed by the battery state sensing unit 55 is not over the third threshold which is higher than the first threshold, or the residual capacity of the battery 50 is not over the forth threshold (for example, 50% or 60%) which is higher than the second threshold, the controller 70 returns to step S104 in FIG. 3 to continue charging of the battery 50 by setting the minimum rotation speed of the engine 22 through the first engine rotation speed setting program 74 by referring to the mapping graph shown in FIG. 4.

In contrast, when it is determined that the voltage of the battery 50 sensed by the battery state sensing unit 55 is over the third threshold or the residual capacity of the battery 50 is over the forth threshold, the controller 70 determines that the battery 50 is charged up to a degree capable of outputting electric power, and proceeds to step S107 in FIG. 3 to calculate the electric power output capability (Wout) from the battery by executing the electric power output capability calculation program 76 shown in FIG. 1.

The controller 70 stores, for example, a map defining the electric power output capability (Wout) from the battery 50 in accordance with the residual capacity and temperature of the battery 50, or a map defining the electric power output capability (Wout) from the battery 50 in accordance with the voltage, the output electric current, and the temperature of the battery 50 in a ROM such that the controller 70 calculates the electric power output capability (Wout) from the battery 50 in accordance with the residual capacity and the temperature of the battery 50, or the voltage, the output electric current, and the temperature of the battery 50 input from the battery state sensing unit 55, together with these maps.

Next, as shown in step S108 in FIG. 3, the controller 70 executes the second engine rotation speed setting program 75 shown in FIG. 1, and starts output from the battery 50 as shown in step S109 in FIG. 3. The controller 70 performs reverse travel by driving the first motor generator 51 by the engine 22 as a power generator to drive the second motor generator 52 with the generated electric power and the electric power output (Wout) from the battery 50. At this time, the electric power supplied from the first motor generator 51 to the battery 50 is lower than the electric power supplied from the battery 50 to the second motor generator 52 for the amount of the electric power output (Wout) from the battery 50. Therefore, although the battery 50 receives electric power, the battery 50 is not charged and the residual capacity decreases by the amount of the output electric power. Further, the output of the engine 22 is reduced compared to when the first engine rotation speed setting program 74 is being executed.

The controller 70 selects a line within the hatched area in FIG. 4 in accordance with the electric power output capability (Wout) calculated in advance in step S107 in FIG. 3, and sets the minimum rotation speed NL of the engine 22 based on the selected line (although a single broken line is shown as an example in the hatched area in FIG. 4, and other lines are omitted, two or more lines should be available based on the magnitude of the electric power output capability (Wout)). For example, for a relatively high Wout, the minimum rotation speed of the engine 22 is set lower as shown by lines d', e', or f' in FIG. 4, while for a higher Wout, the minimum rotation speed NL of the engine 22 is set higher as shown by lines d, e, and f. Further, the controller 70 sets the generated power of the first motor generator 51 lower for the amount of the output electric power (Wout) of the battery 50 than in case when the first engine rotation speed setting program 74 is executed, and reduces the output from the engine 22 in accordance with the generated power. As described above, when the electric power from the battery 50 can be used to drive the second motor generator 52, the controller 70 sets a lower minimum rotation speed of the engine 22 to reduce the generated power, such that by operating the engine 22 at an operation point having the highest possible efficiency, the system efficiency of the hybrid vehicle 100 as a whole can be advantageously improved.

As shown in step S110 in FIG. 3, the controller 70 determines that the battery 50 is capable of outputting electric power when the voltage of the battery 50 is not less than or equal to the first threshold, or the residual capacity of the battery 50 is not less than or equal to the second threshold, and returns to step S107 in FIG. 3 to calculate the electric power output capability (Wout) and continues the reverse travel by executing the second engine rotation speed setting program 75.

As described above, while the second engine rotation speed setting program 75 is executed, the residual capacity of the battery 50 decreases. The controller 70 recalculates the electric power output capability (Wout) in accordance with the decrease of the residual capacity of the battery 50. The controller 70 sets a higher minimum rotation speed NL of the engine 22 for a lower residual capacity as at the lines d, e, or f within the hatched area shown in FIG. 4 in order to compensate the decrease of the electric power output capability (Wout) of the battery 50 due to a decrease in the residual capacity of the battery 50, and sets a higher output from the engine 22.

As shown in step S110 in FIG. 3, the controller 70 determines that the electric current output capability (Wout) of the battery 50 has dropped to zero when the voltage of the battery 50 is equal to or below the first threshold, or the residual capacity of the battery 50 is equal to or below the second threshold, and proceeds to step S111 in FIG. 3 to determine whether or not the hybrid vehicle 100 continues to be travelling in reverse. When the hybrid vehicle 100 continues to be travelling in reverse, the controller 70 returns to step S104 shown in FIG. 3 to execute the first engine rotation speed setting program 74 shown in FIG. 1 to reset the minimum rotation speed of the engine 22 to recharge the battery 50. In contrast, for example, when the shift position is not in the reverse position, but in the forward position or the neutral position in step S111 in FIG. 3, the hybrid vehicle 100 determines that the reverse travel has been finished and finishes the reverse travel control.

As described above, according to a hybrid vehicle 100 according to the embodiments of the present invention, a higher minimum rotation speed NL of the engine 22 is set for a larger drive torque demanded by the driver through the depression of the accelerator pedal. Thus, the vehicle drive torque Tt transmitted to the ring gear shaft 32a (vehicle drive shaft) becomes higher, resulting in greater balance between the driver's driving comfort, the rotation speed of the engine 22, and the magnitude of the driving force. Therefore, the drivability in reverse travel can be improved. Further, because a higher minimum rotation speed NL of the engine 22 is set in accordance with the map shown in FIG. 4, the engine 22 is not always operated at a high rotation speed. In addition to this advantage, because the minimum rotation speed of the engine 22 is decreased in accordance with the electric power output capability (Wout) of the battery 50, the system efficiency of the hybrid vehicle 100 in reverse uphill travel can be efficiently improved, resulting in a longer drivable distance.

The present invention is not limited to each of the above embodiments. Various changes and modifications within the technical scope or essential spirit of the present invention defined in the claims are considered to be included in the present invention.

What is claimed is:

1. A hybrid vehicle comprising:
an engine;
a first motor generator;
a motive power distributor which distributes motive power transmitted from the engine to the first motor generator and a vehicle drive shaft;
a second motor generator which transmits motive power to the vehicle drive shaft;
a chargeable and dischargeable battery which transmits electric power to and from the first motor generator and the second motor generator;
a battery state sensor which detects a voltage and a residual capacity of the battery;
a steepness sensor which detects senses an uphill steepness in a travel direction;
an accelerator pedal depression amount sensor which detects an accelerator pedal depression amount; and
a controller which controls a rotation speed of the engine, wherein when the hybrid vehicle is traveling in reverse as a result of driving the vehicle drive shaft using the second motor generator, the controller is configured to:
set a minimum rotation speed of the engine in accordance with
the uphill steepness in the travel direction detected by the steepness sensor; and
the accelerator pedal depression amount detected by an accelerator pedal depression amount sensor;
charge the battery by driving the first motor generator using the engine with the set minimum rotation speed of the engine when the voltage of the battery is equal to or below a first threshold or when the residual capacity of the battery is equal to or below a second threshold.

2. The hybrid vehicle according to claim 1, wherein the controller sets a higher minimum rotation speed of the engine for a larger uphill steepness in the travel direction and a larger accelerator pedal depression amount.

3. The hybrid vehicle according to claim 1, wherein when the hybrid vehicle is traveling in reverse as a result of driving the vehicle drive shaft using the second motor generator, the controller is further configured to:
calculate an electric power output capability of the battery in accordance with the voltage or the residual capacity of the battery detected by the battery state sensor; and
set the minimum rotation speed of the engine in accordance with
the uphill steepness in the travel direction detected by the steepness sensor;
the accelerator pedal depression amount detected by the accelerator pedal depression amount sensor; and
the calculated electric power output capability;
drive the first motor generator by the engine to supply electric power to the battery when the voltage of the battery is over a third threshold higher than the first threshold or the residual capacity of the battery is over a fourth threshold higher than the second threshold.

4. The hybrid vehicle according to claim 2, wherein when the hybrid vehicle is traveling in reverse as a result of driving the vehicle drive shaft using the second motor generator,
the controller is further configured to:
calculate the output power of the battery in accordance with the voltage or the residual capacity of the battery detected by the battery state sensor; and
set the minimum rotation speed of the engine in accordance with the uphill steepness in the travel direction detected by the steepness sensor;

the accelerator pedal depression amount detected by the accelerator pedal depression amount sensor; and the calculated electric power output capability, drive the first motor generator by the engine to supply electric power to the battery when the voltage of the battery is over a third threshold higher than the first threshold or the residual capacity of the battery is over a fourth threshold higher than the second threshold.

5. A hybrid vehicle according to claim 3, wherein the controller sets a higher minimum rotation speed of the engine for a larger uphill steepness in the travel direction and a larger accelerator pedal depression amount; and the controller sets a lower minimum rotation speed of the engine for a larger electric power output capability of the battery.

6. A hybrid vehicle according to claim 4, wherein the controller sets a higher minimum rotation speed of the engine for a larger uphill steepness in the travel direction and a larger accelerator pedal depression amount; and the controller sets a lower minimum rotation speed of the engine for a larger electric power output capability of the battery.

7. A hybrid vehicle comprising:

an engine;

a first motor generator;

a motive power distributor which distributes motive power transmitted from the engine to the first motor generator and a vehicle drive shaft;

a second motor generator which transmits motive power to the vehicle drive shaft;

a chargeable and dischargeable battery which transmits electric power to and from the first motor generator and the second motor generator;

a battery state sensor which detects a voltage and a residual capacity of the battery;

a steepness sensor which detects an uphill steepness in a travel direction;

an accelerator pedal depression amount sensor which detects an accelerator pedal depression amount; and a controller which includes a CPU and controls the rotation speed of the engine, wherein when the hybrid vehicle is traveling in reverse as a result of driving the vehicle drive shaft using the second motor generator, the CPU executes a first engine rotation speed setting program which sets a minimum rotation speed of the engine in accordance with the uphill steepness in the travel direction detected by the steepness sensor; and the accelerator pedal depression amount detected by the accelerator pedal depression amount sensor, charge the battery by driving the first motor generator using the engine with the set minimum rotation speed of the engine when the voltage of the battery is equal to or below a first threshold or when the residual capacity of the battery is equal to or below a second threshold.

8. A method for controlling a hybrid vehicle including:

an engine;

a first motor generator;

a motive power distributor which distributes motive power transmitted from the engine to the first motor generator and a vehicle drive shaft;

a second motor generator which transmits motive power to the vehicle drive shaft;

a chargeable and dischargeable battery which transmits electric power to and from the first motor generator and the second motor generator;

a battery state sensor which detects a voltage and a residual capacity of the battery;

a steepness sensor which detects an uphill steepness in a travel direction; and an accelerator pedal depression amount sensor which detects an accelerator pedal depression amount;

the method comprising:

determining whether the hybrid vehicle is travelling in reverse as a result of driving the vehicle drive shaft by the second motor generator;

in response to determining that the hybrid vehicle is travelling in reverse as a result of driving the vehicle drive shaft by the second motor generator setting a minimum rotation speed of the engine in accordance with the uphill steepness in the travel direction detected by the steepness sensor; and the accelerator pedal depression amount detected by the accelerator pedal depression amount sensor, charging the battery by driving the first motor generator using the engine with the set minimum rotation speed of the engine when the voltage of the battery is equal to or below a first threshold or when the residual capacity of the battery is equal to or below a second threshold.

* * * * *